US006755233B2

(12) United States Patent
Fisher

(10) Patent No.: US 6,755,233 B2
(45) Date of Patent: Jun. 29, 2004

(54) METHOD AND APPARATUS FOR POSITIONING AN END OF A PUSH ROD OF A BRAKE ACTUATOR

(75) Inventor: Albert D. Fisher, Kansas City, MO (US)

(73) Assignee: Haldex Brake Corporation, Kansas City, MO (US)

( * ) Notice: Subject to any disclaimer, the term of this patent is extended or adjusted under 35 U.S.C. 154(b) by 0 days.

(21) Appl. No.: 10/288,122

(22) Filed: Nov. 5, 2002

(65) Prior Publication Data

US 2004/0084255 A1 May 6, 2004

(51) Int. Cl.$^7$ ............................................... B22D 19/00
(52) U.S. Cl. ......................................... 164/112; 164/98
(58) Field of Search ............................ 164/98, 99, 111, 164/112

(56) References Cited

U.S. PATENT DOCUMENTS

| | | |
|---|---|---|
| 4,861,256 A | 8/1989 | Covey |
| 4,960,036 A | 10/1990 | Gummer et al. |
| 4,984,980 A | 1/1991 | Ueno |
| 5,494,139 A | 2/1996 | Le Deit et al. |
| 5,551,537 A | 9/1996 | Mery et al. |
| 5,579,873 A | 12/1996 | Kohar et al. |
| 5,793,561 A | 8/1998 | Ibaraki et al. |
| 6,050,372 A | 4/2000 | Fisher |
| 6,073,732 A | 6/2000 | Angerfors |
| 6,186,286 B1 | 2/2001 | Haussler et al. |
| 6,267,043 B1 | 7/2001 | Plantan et al. |
| 6,292,077 B1 | 9/2001 | Kaizuka et al. |
| 6,349,629 B1 | 2/2002 | Plantan et al. |
| 6,371,500 B1 | 4/2002 | Goddard |

*Primary Examiner*—Kiley Stoner
*Assistant Examiner*—Len Tran
(74) *Attorney, Agent, or Firm*—St. Onge Steward Johnston & Reens LLC

(57) ABSTRACT

A method and apparatus for positioning components of a brake system, which includes a push rod, a ball end coupled to the push rod, and a force transfer member placed between the push rod and the ball end. The force transfer member has both a flowable property and a solidifying property, whereby the force transfer member is flowable when being placed between the push rod and ball end and, after a passage of time, the force transfer member solidifies.

19 Claims, 5 Drawing Sheets

METHOD AND APPARATUS FOR POSITIONING AN END OF A PUSH ROD OF A BRAKE ACTUATOR

FIELD OF THE INVENTION

The invention relates to braking systems and, more particularly, a method and apparatus for positioning an end of a push rod of a brake actuator.

BACKGROUND OF THE INVENTION

Braking systems, such as air brake systems, have generally been used to control movement of motor vehicles in a safe and effective manner. In particular, air brakes are commonly used on commercial vehicles such as trucks, trailers, and buses, which typically have large gross vehicle weights. The considerable inertial mass of these heavy-duty vehicles in combination with the high speeds at which they travel often requires a braking system which responds rapidly with substantial braking power. One system component which may be instrumental in the operation of air brake systems is the brake actuator. The brake actuator typically provides the necessary force when braking the vehicle.

FIG. 1 depicts a push rod generally known in the art. The push rod is a component of brake actuator 12 and is commonly found in many air disc brake systems. As shown, push rod 10 typically extends outwardly away from a mounting face 17 of brake actuator 12. The end of push rod 10 engages with ball end 16 of arm 14, typically a socket part of arm 14. Usually, the overall length L' of push rod 10 and ball end 16 relative to mounting face 17 is important to proper braking. Because of such importance, the overall length L' may be adjustable. Traditional braking systems, as illustrated in FIG. 1, often used shims 18, or spacers, placed between ball end 16 and push rod 10 to variably adjust overall length L'.

U.S. Pat. No. 5,579,873 to Kohar et al. ("Kohar") relates to a brake actuator system having calipers that may close upon a disc in order to apply the brakes. Similar to the push rod of FIG. 1, Kohar may also use spacers to operate as shims in adjusting the calipers.

It is typically accepted and known that the overall length of the push rod and ball end relative to a mounting face surface of the actuator is usually essential to proper functioning of the brake system. If this length is too short, a user may need to apply the brakes in a more vigorous manner to brake the vehicle than if the overall length was properly determined. If the overall length is too long, the brakes may be applied continuously or when a user does not wish the vehicle to be braked, which may cause premature wear on the brakes. Because of the importance of the overall length, using shims to variably adjust the overall length may negatively affect accurate determinations of this length, which may possibly affect braking performance.

Usually, the overall length is determined within an acceptable tolerance range. Similarly, the components that make up the overall length, namely the push rod, ball end, and any shims used, are also typically manufactured within a known tolerance range. Combining the components typically results in the combination of the tolerances of the individual components to determine the overall tolerance range. This combination of the tolerances is known in the art to be defined as a "tolerance stack up". The more shims used, the larger the overall tolerance range may become. In some instances, especially where an accurate determination of the overall length is desired, the resulting tolerance stack up may be larger than the acceptable tolerance range for the overall length, resulting in the overall length to be out of tolerance. Furthermore, variability in the actual dimensions of the components that results in an out of tolerance overall length may necessitate provisions for adjustments in order to bring the overall length back within tolerance, such provisions in turn may contribute to tolerance stack up.

Another disadvantage of using shims is that it may increase set up time for positioning the push rod relative to the ball end. The more shims involved to position the push rod relative to the ball end, the more time is typically needed to choose the correctly sized shims or interchange shims. Furthermore, if components of the braking system are interchanged, such as parts of the brake actuator, the shims may shift out of position, thereby necessitating repositioning of the push rod relative to the ball end. This problem may be exacerbated if the combination of shims chosen are not suited to the components of the braking system, where variability between braking systems sometimes favor particular combinations of shims. Adhering the shims to one another may reduce set up time but may also exacerbate tolerance stack up due to the adhesive material now being placed between the shims and affecting the overall length.

What is desired, therefore, is a push rod and ball end assembly that provides an accurate determination of the overall length relative to the mounting face surface. Another desire is a push rod and ball end assembly that reduces tolerance stack up. A further desire is a push rod and ball end assembly that reduces variability in overall length caused by tolerance stack up. Still another desire is a push rod and ball end assembly that reduces set up time.

SUMMARY OF THE INVENTION

Accordingly, it is an object of the invention to provide a push rod and ball end assembly that has an accurately determined overall length and distance from a surface of an actuator's mounting face.

It is another object of the invention to provide a push rod and ball end assembly that maintains its accurately determined overall length over prolonged use of the brake system.

It is another object of the invention to provide a push rod and ball end assembly that reduces set up time when interchanging components of a brake system.

These and other objects of the invention are achieved by provision of an apparatus for positioning components of a brake system, including a push rod, a ball end coupled to the push rod, and a force transfer member placed between the push rod and the ball end. The force transfer member has both a flowable property and a solidifying property, whereby the force transfer member is flowable when being placed between the push rod and ball end and, after a passage of time, the force transfer member solidifies.

In the preferred embodiment, the force transfer member is self hardening, where it automatically solidifies without user intervention. In other embodiments, an additive is added to the force transfer to solidify or facilitate solidifying the force transfer member.

The ball end may optionally include a hole extending from a first end and a second end of the ball end for permitting the force transfer member to be placed, or injected, between the push rod and ball end.

In another aspect of the invention, a method for positioning components of a brake system is provided, including the steps of providing a push rod of a brake actuator and providing a ball end. The method also includes the steps of positioning the push rod relative to the ball end, placing a force transfer member between the push rod and the ball end, and solidifying the force transfer member.

The method may optionally include the step of temporarily or permanently fixing the position of the push rod relative to the ball end.

Prior to placing the force transfer member between the push rod and ball end, or in embodiments where the ball end is temporarily fixed relative to the push rod, the method may optionally include the step of adjusting a distance of the ball end relative to a mounting face of the brake actuator.

Additionally, the method may optionally include the step of providing a hole in the ball end, wherein the hole extends an entire length of the ball end. This hole permits injection of the force transfer member through into the hole and in between the ball end and push rod.

To assist ensuring a proper amount of the force transfer member is placed between the ball end and push rod, the method may include adjusting a flow characteristic of the force transfer member, such as pressure, temperature, flow rate, and combinations thereof, as it is placed between the push rod and the ball end. The method may also continue to place the force transfer member between the push rod and ball end until a desired pressure is achieved.

For embodiments where the force transfer member is not self hardening, or does not automatically solidify without user intervention, the method may include the step of adding an additive to the force transfer member to facilitate solidification.

The invention and its particular features and advantages will become more apparent from the following detailed description considered with reference to the accompanying drawings.

BRIEF DESCRIPTION OF THE DRAWINGS

FIG. 5c depicts a perspective view of the ball end of FIG. 5a.

DETAILED DESCRIPTION OF THE DRAWINGS

Figure 1:
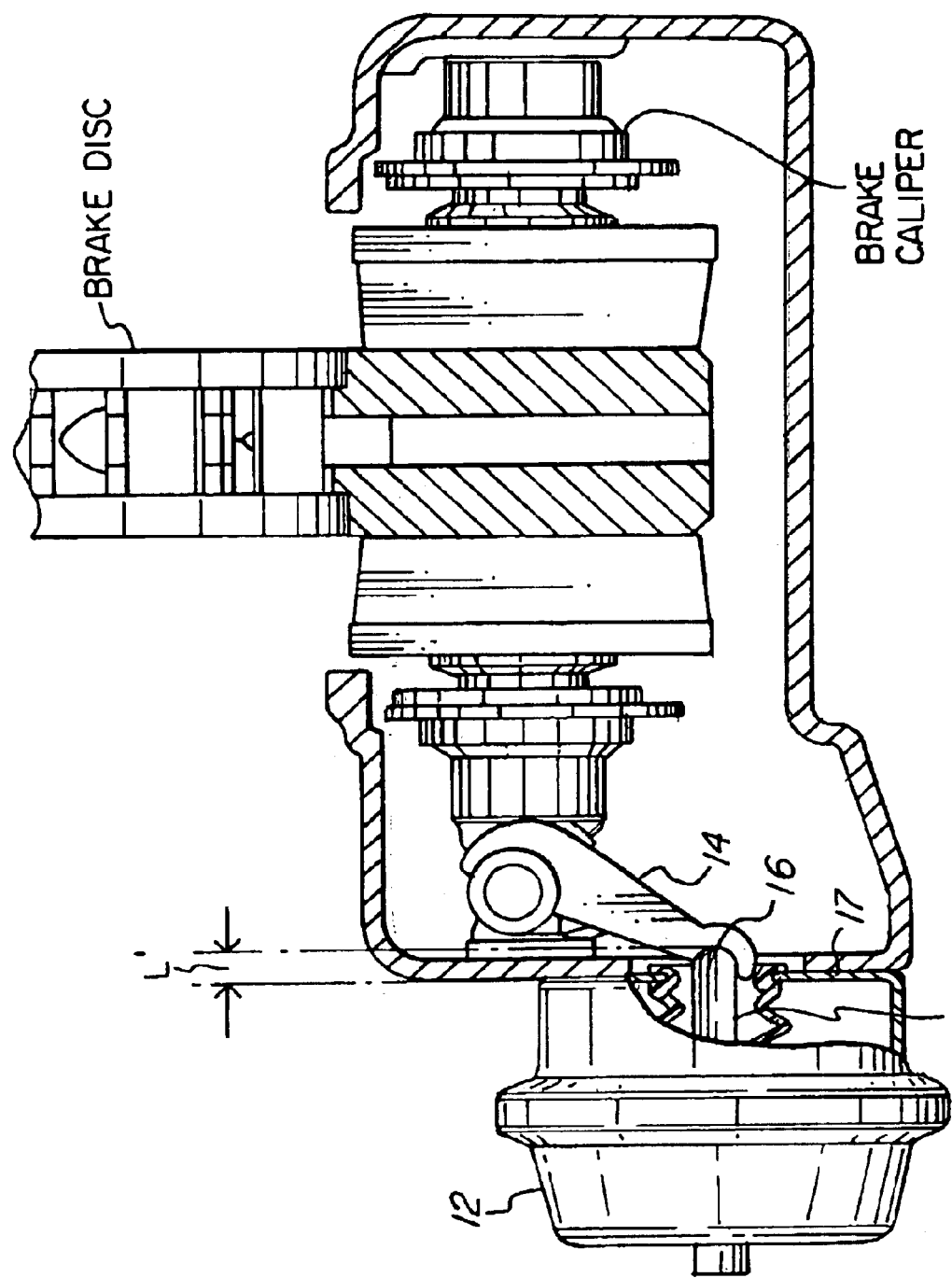
FIG. 1 depicts a traditional brake system known in the art.
Figure 2:
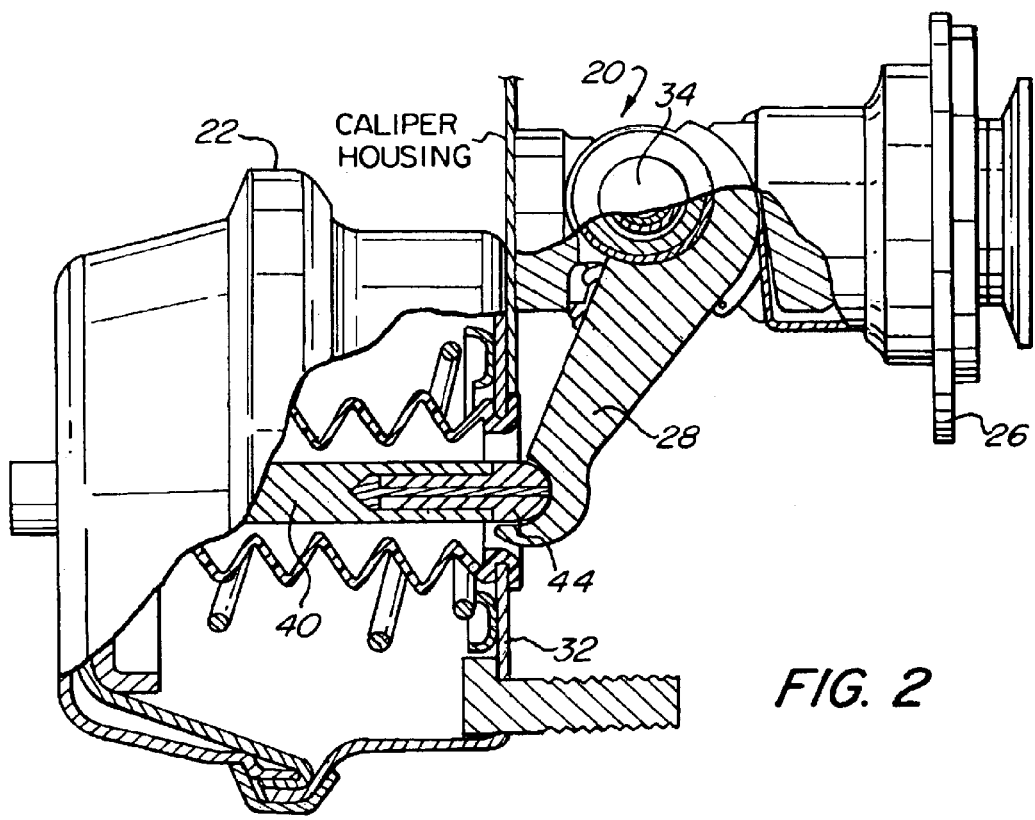
FIG. 2 depicts a brake system in accordance with the invention.

FIG. 2 depicts a brake system 20, including a brake actuator 22, caliper 26 for grasping a disc brake (shown in FIG. 1) during braking, push rod 40, ball end 44, and arm 28 for receiving ball end 44 and transferring the force from ball end 44 to caliper 26. Braking is applied by a vehicle operator pressing on a brake pedal, which causes actuator 22 to push upon push rod 40, which in turn extends away from a mounting face surface 32 and pushes upon ball end 44, which in turn pushes upon arm 28. As a result, arm 28 rotates about pivot 34 and causes caliper 26 to grasp the disc brake, which brakes the axle and wheels. As once can see, the overall length of push rod 40 and ball end 44 relative to mounting face surface 32 affects the rotation of pivot 34 and, therefore, braking. The overall length, represented by dimension L, is shown in FIG. 4b.

Figure 3:
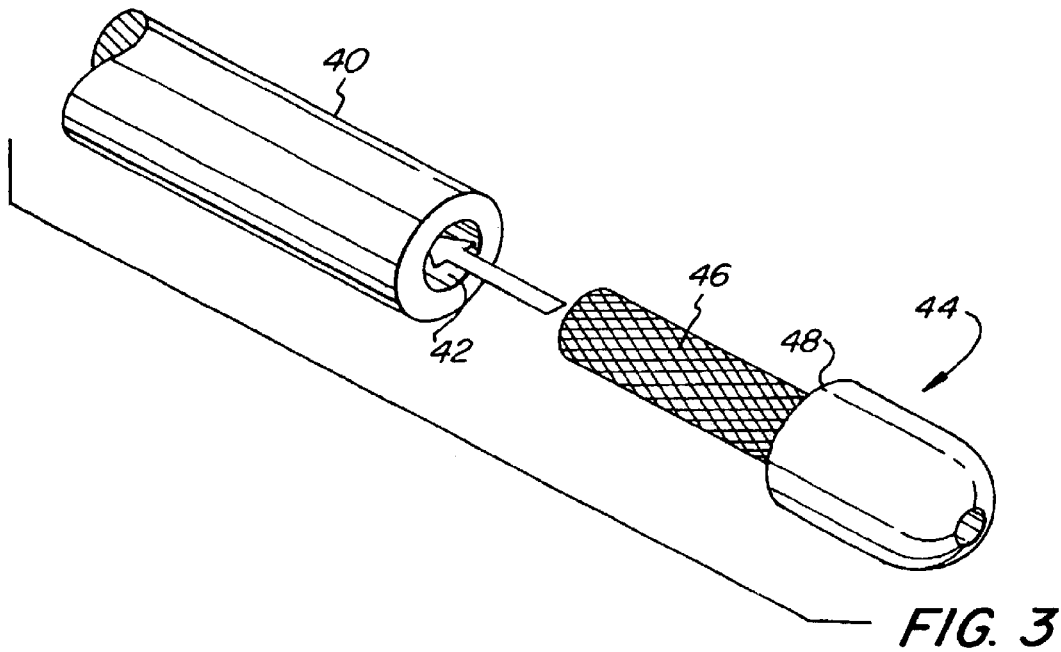
FIG. 3 depicts a push rod and ball end in accordance with the invention.

FIG. 3 more particularly depicts push rod 40 and ball end 44. As shown, ball end 44 is inserted into an opening 42 of push rod 40. Ball end 44 may be inserted to any depth into opening 42 along an inner diameter surface 46 of ball end 44. A shoulder 48 of ball end 44 will be a stopping point, and represents the maximum depth, for the insertion of inner diameter surface 46 into opening 42.

Figure 4A:
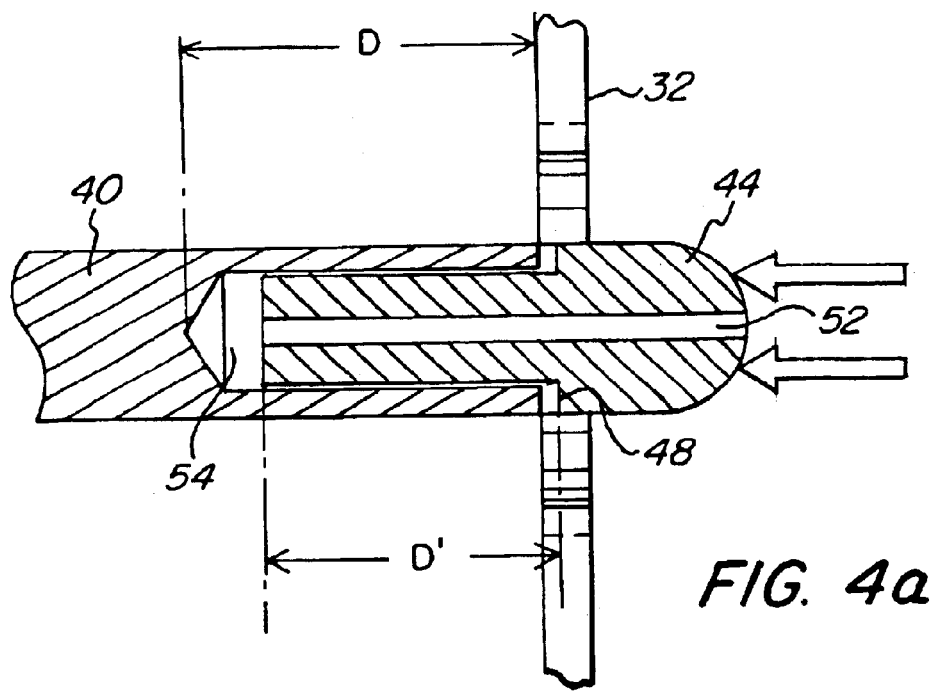
FIG. 4a depicts the push rod positioned relative to the ball end.
Figure 4B:
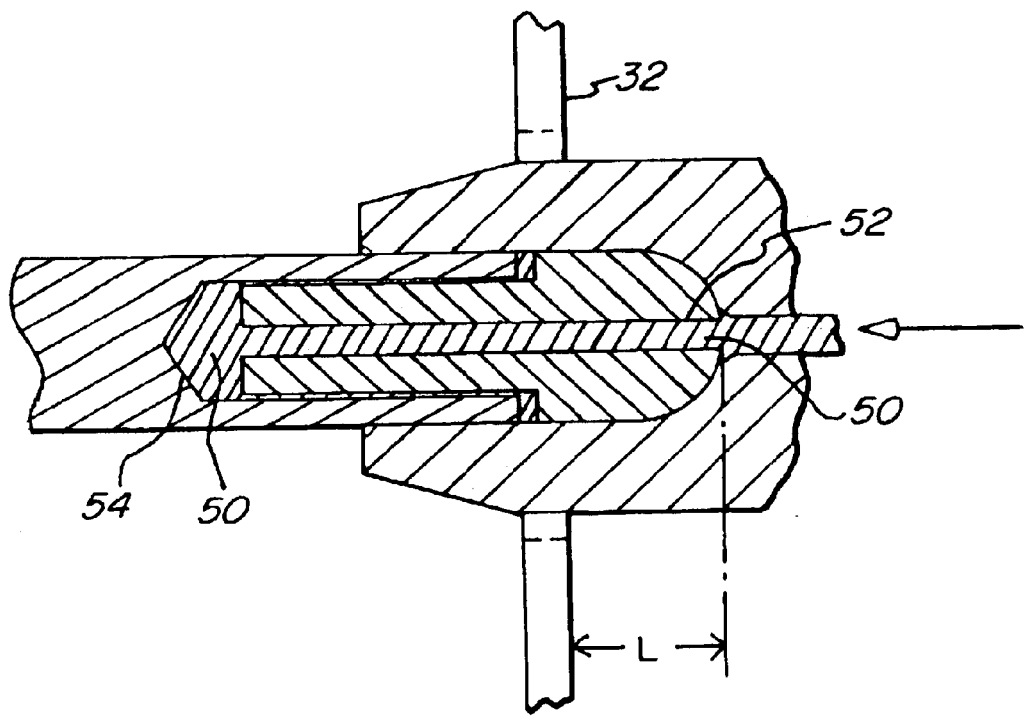
FIG. 4b depicts a force transfer member placed between the push rod and ball end in accordance with the invention.

FIGS. 4a and 4b depict a cross sectional view along a length of ball end 44 and push rod 40. As shown, ball end 44 is positioned relative to push rod 40 in accordance with the invention. FIG. 4a shows ball end 44 inserted to a desired depth within push rod 40. As mentioned under the description of FIG. 3, ball end 44 may be inserted into opening 42 to any position along inner diameter surface 46 up to a point where shoulder 48 contacts push rod 40.

Usually, a depth of opening 42, represented by dimension D, is greater than a length of inner diameter surface 46, represented by D', so that ball end 44 does not bottom out, thereby limiting adjustment of ball end 44 relative to push rod 40. Traditionally, shims are generally placed between shoulder 48 and push rod 40 to fix a position of ball end 44 relative to push rod 40.

However, as described above, the use of shims present several disadvantages. The invention overcomes these disadvantages by using a force transfer member 50 instead of shims, as shown in FIG. 4b. Once ball end 44 is positioned at a desired depth relative to push rod 40, force transfer member 50 is injected through a hole 52 extending the entire length of ball end 44. Force transfer member 50 exits hole 52 and fills an area defining cavity 54 in between ball end 44 and push rod 40.

A benefit of positioning ball end 44 relative to push rod 40 and all other components that affect overall length L prior to placing force transfer member 50 in cavity 54 is that this sequence reduces tolerance stack up. This is because overall length L is not dependent upon the amount of force transfer member 50 placed in cavity 54. Therefore, the tolerances, and tolerance stack up, associated with the components may be negated, corrected, or compensated for by positioning ball end 44 relative to push rod 40 and then fixing this position with force transfer member 50. Conversely, the amount of force transfer member 50 is dependent upon overall length L.

This inventive sequence is very different from the traditional sequence of positioning shims to determine overall length L and final position of ball end 44 relative to push rod 40, where overall length L is dependent upon the amount of shims used. Hence, under the traditional sequence, overall length L is subject to the tolerances, and tolerance stack up, associated with the components of the brake system.

To ensure cavity 54 is completely filled with force transfer member 50, pressure, temperature, and/or flow rate of force transfer member 50 may be varied so that air bubbles are not trapped in cavity 54. Moreover, force transfer member 50 is continuously injected into hole 52 until it begins to back out of hole 52, thereby providing a visual indication that cavity 54 is filled since hole 52 has been filled.

In another embodiment, and still maintaining the benefit of reducing tolerance stack up by removing the dependency of overall length L upon the amount of force transfer member 50 placed in cavity 54, force transfer member 50 may be placed in cavity 54 prior to positioning ball end 44 relative to push rod 40. This embodiment achieves the benefit of reducing tolerance stack up provided force transfer member 50 is flowable so that, upon positioning ball end 44 into opening 42, excess force transfer member 50 and/or any trapped air may enter opening 42 and exit cavity 54.

Figure 5A:
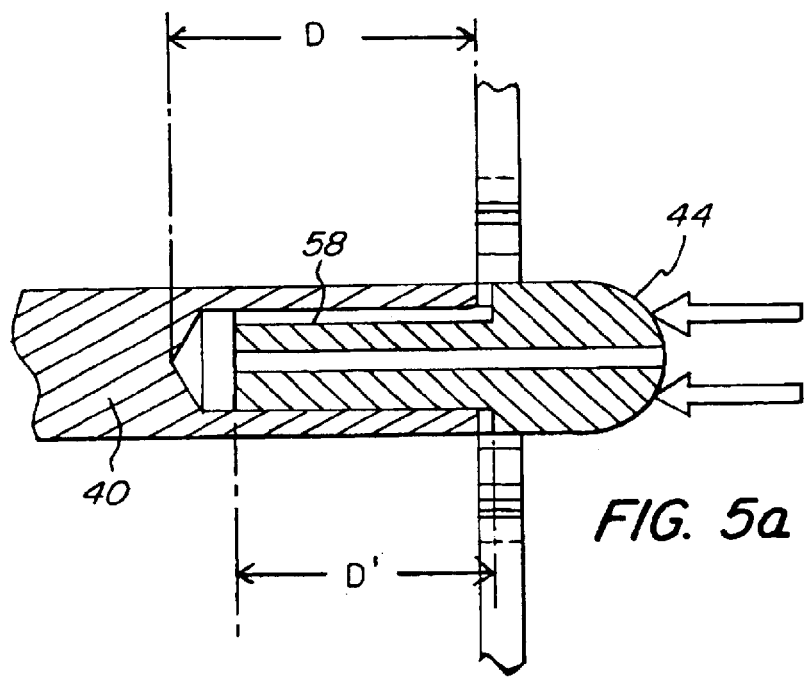
FIG. 5a depicts another embodiment of the ball end.
Figure 5B:
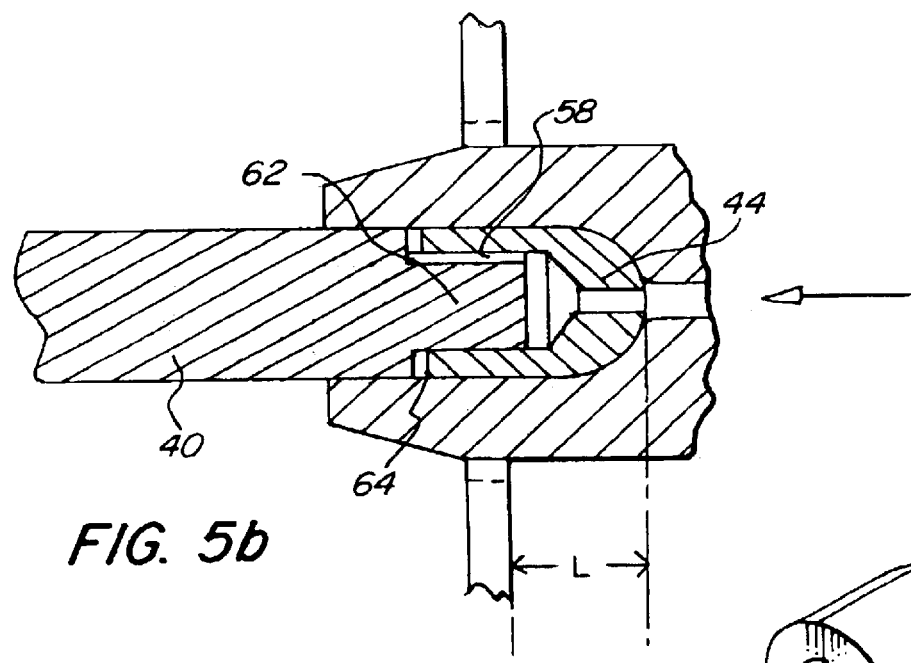
FIG. 5b depicts another embodiment of the push rod.
Figure 5C:
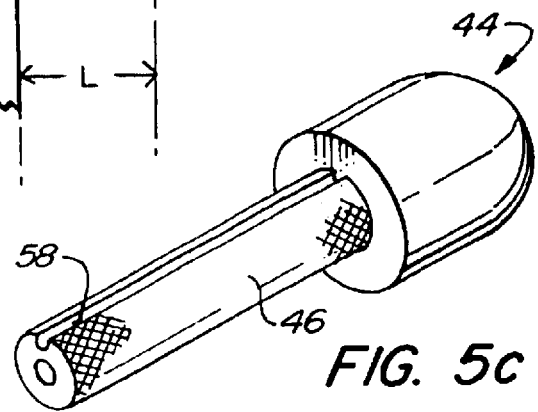

In a further embodiment, shown in FIGS. 5a and 5c, inner diameter surface 46 of ball end 44 includes a recess 58 for permitting air trapped between ball end 44 and push rod 40 to escape. Recess 58 may be a groove, knurl, channel, notch, relief, or any other recess in inner diameter surface 46. How recess 58 is formed is not germane to the invention. Moreover, multiple recesses 58 may be used to expedite the exit of trapped air.

In still another further embodiment, shown in FIG. 5b, push rod 40 includes a protrusion 62 extending into ball end 44. In this embodiment, outer diameter surface 64 of protrusion 62 includes recess 58 for permitting trapped air to escape. Recess 58 in outer diameter surface 64 may be used instead of or in addition to recess 58 in inner diameter surface 46.

Force transfer member 50 may be of a variety of materials and be in a liquid or solid state. In a preferred embodiment, member 50 is molten zinc or a zinc alloy. In other embodiments, member 50 is any flowable compound having an ability to be injected into hole 52 and cavity 54 and, subsequently, to harden and position ball end 44 relative to push rod 40. It is preferred for member 50 to be of an incompressible compound in both the solid and liquid states. In other embodiments, member 50 may be compressible in the liquid state but should, when hardened or solidified, be an incompressible solid material.

In a preferred embodiment, member 50 solidifies or hardens after a passage of time without user intervention. In other embodiments, an additive is combined with member 50 or member 50 is heated to facilitate solidification. Member 50 may be a solid, such as a powder, and is hardened after a solution is added to the powder. The additive may be injected into hole 52 prior to, during, or after member 50 is injected. In further embodiments, the additive lines or coats opening 42 or cavity 54 so that, upon or subsequent to member 50 being injected through hole 52, member 50 begins to solidify.

In the embodiments where an additive is added before, during, or after member 50 is injected into hole 52, member 50 solidifies after a passage of time, no matter how small or large. The invention envisions member 50 solidifying upon coming in contact, or instantaneously, with the additive. In these embodiments, a fraction of a second may have passed between contact and solidification and it is understood that these embodiments are part of the invention.

Force transfer member 50 may be injected using any known or novel injection machines. The machine for injecting force transfer 50 is not germane to the invention.

Figure 6:
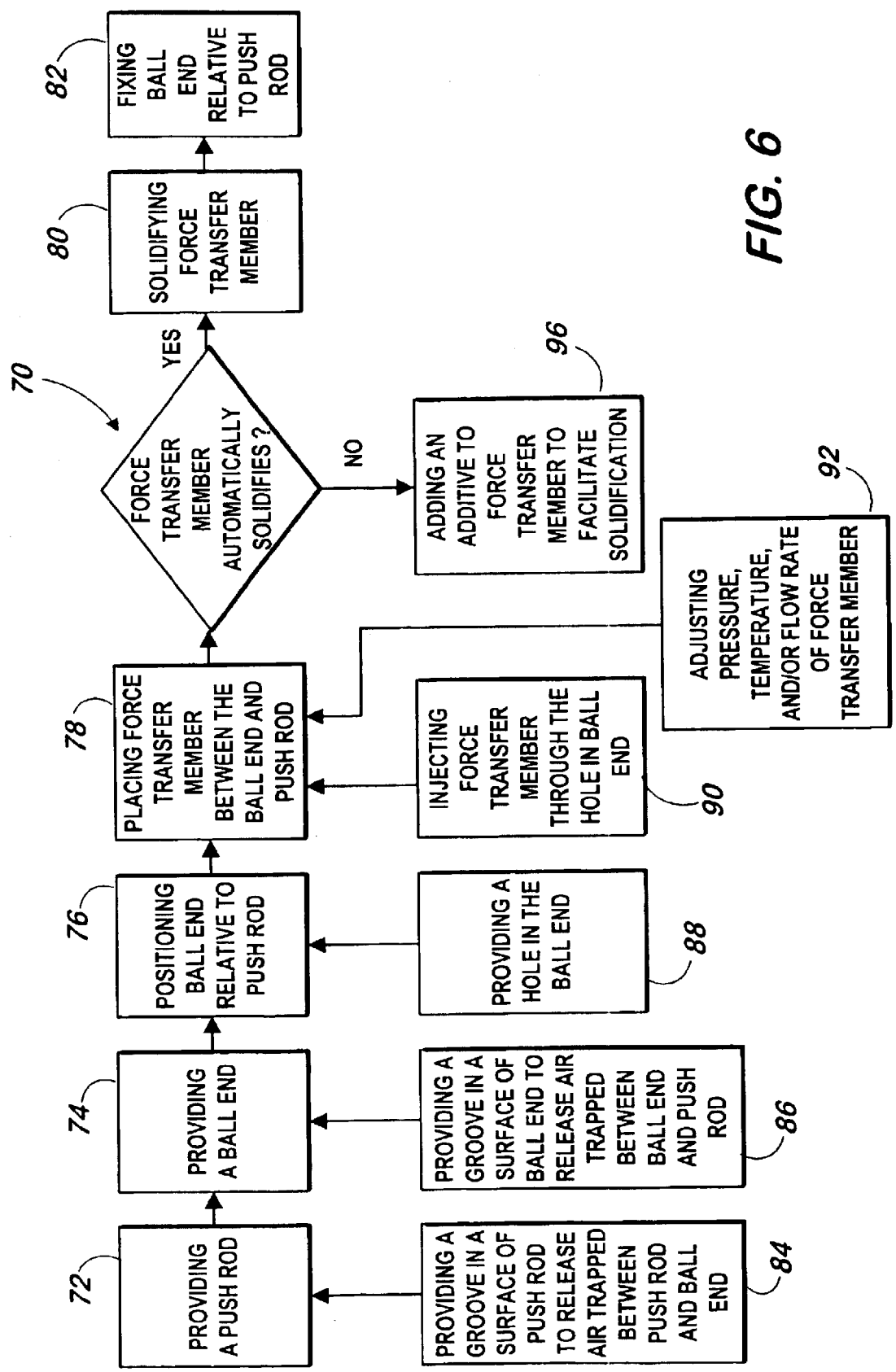
FIG. 6 depicts a method for positioning the ball end relative to the push rod.

FIG. 6 depicts a method 70 for positioning ball end 44 relative to push rod 40. Method 70 includes the steps of providing 72 a push rod, providing 74 a ball end, and positioning 76 ball end 44 relative to push rod 40.

As mentioned above under FIGS. 3 and 4a, ball end 44 is positioned 76 relative to push rod 40 by inserting inner diameter surface 46 into opening 42 to a desired depth.

Once positioned, method 70 includes placing 78 force transfer member 50 between push rod 40 and ball end 44. A benefit of positioning 76 ball end 44 relative to push rod 40 and all other components that affect overall length L prior to placing 78 force transfer member 50 in cavity 54 is that, in this sequence, method 70 reduces tolerance stack up. This benefit is more particularly described under FIGS. 4a and 4b.

Either with or without user intervention, method 70 also includes the step of solidifying 80 force transfer member 50.

In the preferred embodiment and after a passage of time, force transfer member automatically solidifies 80. In other embodiments, method may include the step of adding 96 an additive to force transfer member 50 in order to facilitate solidification or hardening. Method may add 96 the additive as a requirement or as an aid for solidification. Method may add 96 the additive before, during, or after placing 78 the force transfer member in between push rod 40 and ball end 44.

After solidifying 80 the force transfer member in place, method 70 may include fixing 82, or locking, the position of ball end 44 relative to push rod 40. Fixing 82 the position may be either temporary or permanent, depending upon whether or not later adjustments or interchangeability of components of brake system 20 are envisioned.

Method 70 may also include the step of providing 88 hole 52 in ball end 44, where hole 52 extends the entire length of ball end 44. Hole 52, permits placing 78 force transfer member 50 between push rod 40 and ball end 44 by injecting 90 member 50 into hole 52, which will then travel to and fill cavity 54.

Method 70 may inject 90 member 50 into hole 52 until a desired pressure is achieved in member 50, thereby helping to ensure that cavity 54 is sufficiently filled and able to transfer forces between push rod 40 and ball end 44. To reduce air bubbles in cavity 54, which may negatively affect the ability of push rod 40 to transfer forces to ball end 44, method 70 may adjust 92 the pressure, temperature, and/or flow rate of force transfer member 50. Additionally, force transfer member 50 may be injected 90 into hole 52 until it begins to back out of hole 52, thereby providing a visual indication that cavity 54 is filled since hole 52 has been filled.

In another aspect, and still maintaining the benefit of reducing tolerance stack up by removing the dependency of overall length L upon the amount of force transfer member 50 placed in cavity 54, method 70 may place 78 force transfer member 50 in cavity 54 prior to positioning 76 ball end 44 relative to push rod 40. This aspect achieves the benefit of reducing tolerance stack up provided force transfer member 50 is flowable so that, upon positioning 76 ball end 44 into opening 42, excess force transfer member 50 and/or any trapped air may enter opening 42 and exit cavity 54.

In a further aspect, method 70 may optionally include the step of providing 84 a groove in a surface, such as outer diameter surface 64 of protrusion 62 shown in FIG. 5b, of the push rod to release air trapped between the push rod and ball end.

In still another further aspect, method 70 may optionally include the step of providing 86 a recess in a surface, such as inner diameter surface 46 of ball end 44 shown in FIG. 5a, of the ball end to release air trapped between the push rod and ball end.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method for positioning components of a brake system, comprising the steps of:

providing a push rod of a brake actuator and providing a ball end;

positioning the push rod relative to the ball end;

placing a force transfer member in a liquid state between the push rod and the ball end; and solidifying the force transfer member.

2. The method according to claim 1, further comprising the step of fixing the position of the push rod relative to the ball end.

3. The method according to claim 2, further comprising the step of permanently fixing the position of the push rod relative to the ball end.

4. The method according to claim 1, further comprising the step of adjusting a distance of the ball end relative to a mounting face of the brake actuator prior to placing the force transfer member between the push rod and ball end.

5. The method according to claim 1, further comprising the step of providing a hole in the ball end, wherein the hole extends an entire length of the ball end.

6. The method according to claim 5, further comprising the step of injecting the force transfer member into the hole.

7. The method according to claim 1, further comprising the step of placing the force transfer member between the push rod and the ball end until a desired pressure is achieved.

8. The method according to claim 1, further comprising the step of adjusting a flow characteristic of the force transfer member as it is placed between the push rod and the ball end.

9. The method according to claim 8, wherein the flow characteristic is selected from the group consisting of a pressure, a temperature, a flow rate, and combinations thereof.

10. The method according to claim 1, further comprising the step of adding an additive to the force transfer member to facilitate solidification.

11. A method for positioning components of a brake system, comprising the steps of:

providing a push rod of a brake actuator and providing a ball end, the push rod and the ball end being connected so as to be displaceable relative to each other;

adjusting a position of the ball end relative to a mounting face of the brake actuator;

placing a flowable force transfer member between the push rod and the ball end; and solidifying the force transfer member such that the push rod and the ball end are now fixedly connected to each other.

12. The method according to claim 11, further comprising the step of fixing the position of the ball end relative to the mounting face.

13. The method according to claim 12, further comprising the step of permanently fixing the position of the ball end relative to the mounting face.

14. The method according to claim 11, further comprising the step of providing a hole in the ball end, wherein the hole extends an entire length of the ball end.

15. The method according to claim 14, further comprising the step of injecting the force transfer member into the hole.

16. The method according to claim 11, further comprising the step of placing the force transfer member between the push rod and the ball end until a desired pressure is achieved.

17. The method according to claim 11, further comprising the step of adjusting a flow characteristic of the force transfer member as it is placed between the push rod and the ball end.

18. The method according to claim 17, wherein the flow characteristic is selected from the group consisting of a pressure, a temperature, a flow rate, and combinations thereof.

19. The method according to claim 11, further comprising the step of adding an additive to the force transfer member to facilitate solidification.

* * * * *